United States Patent [19]
Shader

[11] 3,807,338
[45] Apr. 30, 1974

[54] CONVERTIBLE TRAILER FLOAT AND UTILITY BOAT

[76] Inventor: William C. Shader, 147 Brookdale Cir., McMurray, Pa. 15317

[22] Filed: June 2, 1971

[21] Appl. No.: 149,296

Related U.S. Application Data

[63] Continuation-in-part of Ser. No. 869,750, Oct. 27, 1969, abandoned.

[52] U.S. Cl.............................. 114/60, 9/1 R, 9/6, 114/61, 114/66.5 F
[51] Int. Cl........................................... B63b 35/54
[58] Field of Search............... 9/1 T, 1 R, 6; 114/56, 114/60–63, 65 R, 66.5 F, 43.5, 70, .5 R, .5 BD; 115/1 R, 1 A, .5 A

[56] References Cited
UNITED STATES PATENTS

| | | | |
|---|---|---|---|
| 2,898,877 | 8/1959 | King...................................... | 114/60 |
| 3,265,025 | 8/1966 | Haigh et al. ........................... | 114/60 |
| 3,308,782 | 3/1967 | Dahl...................................... | 115/1 R |
| 3,335,437 | 8/1967 | Judkins................................... | 9/1 R |
| 2,950,701 | 8/1960 | Stefani................................... | 9/6 X |
| 3,067,439 | 12/1962 | Brush............................. | 115/.5 A X |

Primary Examiner—Duane A. Reger
Assistant Examiner—Randolph A. Reese
Attorney, Agent, or Firm—Donn J. Smith, Esq.

[57] ABSTRACT

A trailer float comprises flotation means, and a substantially flat deck structure mounted on the flotation means, with the flotation means being secured to the deck structure adjacent a central opening therein. A ramp structure is secured to the deck structure and extends downwardly therefrom at the deck opening. The ramp structure is shaped to accommodate the wheels of the trailer to aid in raising and lowering the trailer within the deck opening. The central opening is shaped to accommodate at least the floor plan configuration of the trailer, and supporting means are mounted adjacent the deck opening for supporting the trailer therein.

54 Claims, 21 Drawing Figures

PATENTED APR 30 1974

INVENTOR
William C. Shader.
BY Buell, Blenko & Ziesenheim
HIS ATTORNEYS

INVENTOR.
WILLIAM C. SHADER
BY
DONN J. SMITH
HIS ATTORNEY

PATENTED APR 30 1974 3,807,338

INVENTOR.
WILLIAM C. SHADER
BY
DONN J. SMITH
HIS ATTORNEY

CONVERTIBLE TRAILER FLOAT AND UTILITY BOAT

This application is a continuation-in-part of my co-pending application entitled TRAILER FLOAT, Ser. No. 869,750 filed Oct. 27, 1969 now abandoned.

The present invention relates to a float or boat designed to support and transport a large variety of the smaller sizes of house trailers, sometimes referred to as camp and/or travel trailers. The invention is particularly directed to a more or less temporary houseboat construction utilizing a portable, wheel mounted type trailer and a relatively non-complex float structure.

With the present day zeal for camping and other outdoor activities a large number of travel and camping trailers are now in use. In contradistinction of the type of house trailers known as trailer or mobile homes, which require a mdeium-to-large-sized tractor for movement along the highways, travel and camping trailers are readily portable and can be easily moved from place to place by means of passenger automobiles or other relatively small vehicles.

In connection with camping trips and other outings involving the use of travel and/or camping trailers, it is frequently desired to transfer camping equipment, clothing or other personal belongings from the trailer or from the vehicle to various types of boats for water travel. In many cases these boats are provided with sleeping accommodations for extended water excursions. Houseboats are achieving increasing popularity although rather large insofar as inland pleasure craft is concerned. In each case, a relatively large, complicated and not readily portable boat structure is involved together with transfer of considerable quantities of personal belongings and equipment. Moreover, the unusual size of the houseboat and other large pleasure craft renders transportation over the highway system difficult to say the least. Boats with fixed accommodations, such as the conventional types mentioned previously, are largely confined to a particular body of inland water.

In consequence, boats of smaller sizes with limited or no sleeping accommodations are largely in vogue. The extent of water travel for any consecutive period must be seriously curtailed.

With the zest for leisure-time camping and traveling, extended excursions over various types of waterways and inland bodies of water frequently are desired. The provision of means for converting or accommodating the conventional travel or camping trailer for water excursions is, therefore, highly desirable, both from the viewpoints of the ready availability of this type of trailer and the portability thereof and of the relative simplicity of an appropriate float structure therefor. Such float structure should have sufficient buoyancy and dimension configuration to accommodate a variety of sizes of camping and travel trailers to admit of mass production techniques. At the same time the structure of the floats should be relatively non-complex and sufficiently compact either for ready portability or to permit their use as rental units by large numbers of marinas and other docking facilities. The adaptability of such float structure, preferably to an extended range of sizes of camping and travel trailers, would permit its wide usage with only one or a very small assortment of sizes, or other minor adaptation of the float structure. Flotation gear of the type contemplated should be provided with adequate means for easily and quickly adjusting the float to differing sizes, elevations, wheel diameters, and the like of the many and varied types of camping and travel trailers. Finally, the float structure should be motorized for self-propulsion and should admit of facile unloading and loading of the trailer onto the float. Mass production of the float structures is thereby facilitated. In short the trailer float should be capable of quickly and easily converting a conventional travel or camping trailer into a houseboat. In this way, the owner of a conventional trailer of this type can extend his mobility to various types of waterways in addition to the highway system. Desirably, also, the float structure or trailer float should have utility apart from its use as a trailer float, and in any event should be motorized.

I am aware, of course, of a number of proposals for floats arranged to accommodate specific types of travel trailers or camping units. For example in the U.S. Patents to Matrin et al., No. 3,414,916 and Judkins No. 3,335,437, pontoon-like float structures are disclosed for use with a particular shape of camping unit, designed in each case for mounting in the bed of a pick-up truck or the like. The construction of conventional floats in each case virtually limits the application of the float structure to the particular and intended or travel type of camping unit.

The patent to Haigh et al. No. 3,265,025 on the other hand is more particularly adapted for use with wheel mounted units or travel trailers. Although a limited variation in plan size can be accommodated by the Haigh et al. arrangement, the latter reference does not contemplate adaptation of the float structure to travel or camping trailers having, for example, differing floor elevations.

The U.S. Patent to Brush No. 3,067,439 discloses a foldable catamaran for transporting an automobile on water. Although the Brush float is useful for its intended purpose, it is obviously inappropriate for transporting travel trailers, camping trailers and other portable units over water.

Pat. No. 2,898,772 to R. C. King discloses a trailer float which is not provided with a ramp structure or the like for loading and unloading the trailer not only with respect to a trailer well or receptacle on the float but also relative to a shore or docking facility. Moreover it is not possible to align the floor or door sill of the trailer with the surface of the deck structure.

The Patents to DeStefani No. 2,950,701 and Macksoud et al. No. 3,165,216 disclose catamaran and pontoon type float constructions respectively. However, there are no means for supporting or loading and unloading a travel or tent trailer or the like. The same applies to Rasmussen No. 3,025,537, which, like Macksoud is drawn more particularly to a float and skid combination.

Quintana No. 2,199,186 relates to an individual ferry driven by the power train of a transported automobile. Like the King patent, Quintana discloses no means for leveling or aligning the floor surface or door sill of the trailer with a deck structure or for loading or unloading such trailer.

In general, prior float structures for these purposes cannot be conveniently used as utility or pontoon boats, i.e. apart from the addition of a trailer or the like. Specifically, prior trailer floats have been endowed with a relatively high center of gravity relative to the combined trailer and float combination, which militates against the stability of the float and the trailer in water. Such high center of gravity results, of course, from a relatively high profile of the trailer and float combination, which also offers considerable wind resistance, which aggravates the stability problem. An attempt to use conventional trailer floats, with a variety of sizes of travel and/or camping trailers results in displacement between the trailer floor and the deck structure of the float, and renders the use of the combined trailer and float rather inconvenient and in many cases quite hazardous. The loading and unloading of conventional floats is troublesome in many cases, and it is difficult to level the trailer floor with the float deck when loaded.

My novel float construction overcomes these problems and in addition offers a valuable safety margin in the utilization of the float and trailer combination. In one arrangement of my float construction, I employ a pontoon construction which is virtually unsinkable. As an additional safety precaution, I construct a trailer well or hull assembly intermediate the pontoon structure which in itself can be provided with sufficient buoyancy or displacement when loaded to support both the trailer and the float structure in the water, apart from the supportive efficacy of the pontoons. As a further safety measure, the pontoons are displaced outwardly of the trailer well to increase the stability of the float in outrigger fashion. In addition, the elevation of the pontoons relative to the well is established so that little additional weight is imposed upon the outrigger pontoons when a trailer or camper is loaded into the float. As further safety features the pontoons can be compartmented and/or filled with foamed plastic.

I also provide means for levelling a variety of sizes of trailers and campers relative to the deck surface of the float structure so that the door sill and floor of the camper or trailer can be aligned and positioned at the same elevation as the deck surface of the float. The deck structure is at least partially adjustable to substantially engage the plan or floor outline of the trailer or camper and is provided with peripheral railing so that the float when loaded has many or all of the conveniences of a conventional houseboat, depending upon the size and complexity of the conventional trailer mounted on the float.

In addition to the aforementioned buoyancy of the trailer well structure of the float, the trailer well lowers the center of gravity of the trailer and also its vertical profile for increased stability and lessened wind resistance. The trailer well in combination with the elevational adjustment described in detail below, permits the trailer to be mounted in the well so that the entrances of the trailer is flush with the float deck. A single float structure (with a single trailer well size), therefore, can be adapted to a wide variety of sizes of travel trailers and campers. Adjustable deck plates or suitable fillers can be employed for extending the decking into flush engagement with the adjacent perimeter of the trailer or for otherwise closing the adjacent open spaces of the trailer well in order to enhance the unified effect of the trailer and float combination.

The decking which normally surrounds the trailer when loaded on the float affords an adequate walk or play area, and the decking in a given embodiment can be designed to extend further both laterally and longitudinally of the trailer or camper by the use of appropriately sized and positioned pontoons and overlying deck structure.

For powering the trailer and float combination an outboard motor can be suitably positioned at the rear end of the decking or of the trailer well. Alternatively, an inboard or marine engine can be mounted within the trailer well. A conning column, with suitable controls, can be mounted near the bow of the float. To permit facile loading and unloading of the float structure, the conning column, together with a bow section of the safety railing can be made foldable or removable to permit the trailer wheels to pass thereover.

I accomplish these desirable results by providing a trailer float comprising a buoyant hull having a substantially flat deck structure, said hull being secured to said deck structure at a central opening therein, and a ramp structure mounted in said hull and spaced in substantial alignment with the wheels of said trailer to aid in raising and lowering said trailer wheels within said hull.

I also desirably provide a similar trailer float wherein each of said ramp structures include forward and aft stepped configurations, the steps of the configurations of each of said ramp structures being substantially aligned to receive support means for the associated one of said trailer wheels.

I also desirably provide a similar trailer float wherein an adjustable tongue block is slidably mounted on an inclined portion in said hull for adjustably elevating a trailer tongue forming part of said trailer for levelling a floor or door sill of said trailer relative to said deck structure.

I also desirably provide a trailer float comprising a substantially flat deck having a central opening, a generally central hull structure secured to said deck at a position closely adjacent said opening, and a pair of outrigger pontoons secured adjacent the outward lateral edges respectively of said deck and spaced outwardly of said hull structure.

I also desirably provide a similar trailer float wherein said pontoons and said deck extend forwardly and aft of said hull for additional deck area and buoyancy.

I also desirably provide a similar trailer float wherein each of said pontoons is compartmented, and each of the compartments is filled with a foamed buoyant plastic.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings, wherein similar reference characters with primed accents denote components similar to those of other figures, I have shown certain presently preferred embodiments of the invention and have illustrated certain presently preferred methods of practicing the same, wherein.

Figure 1:
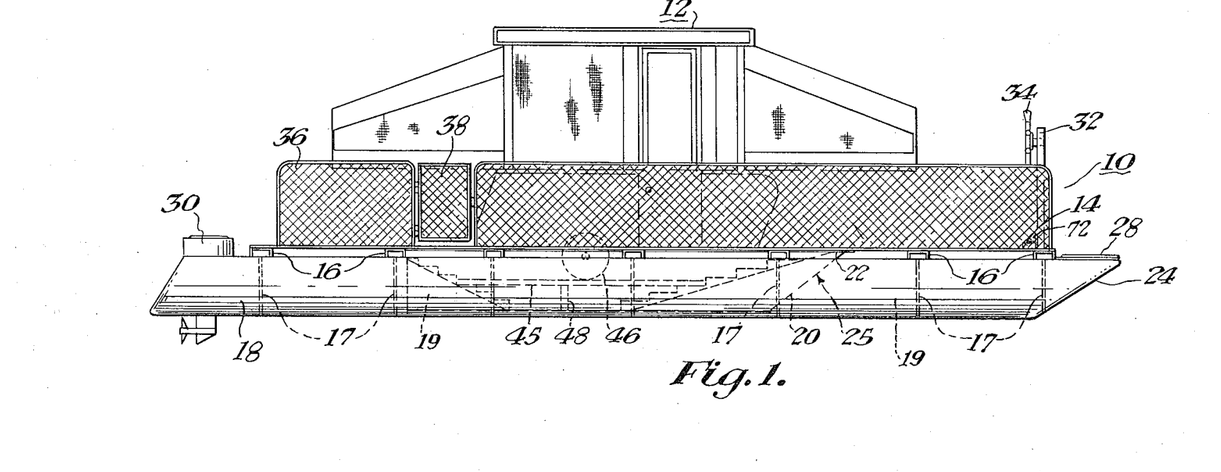
FIG. 1 is a side elevational view of an exemplary arrangement of trailer float and trailer thereon, in accordance with my invention.
Figure 2:
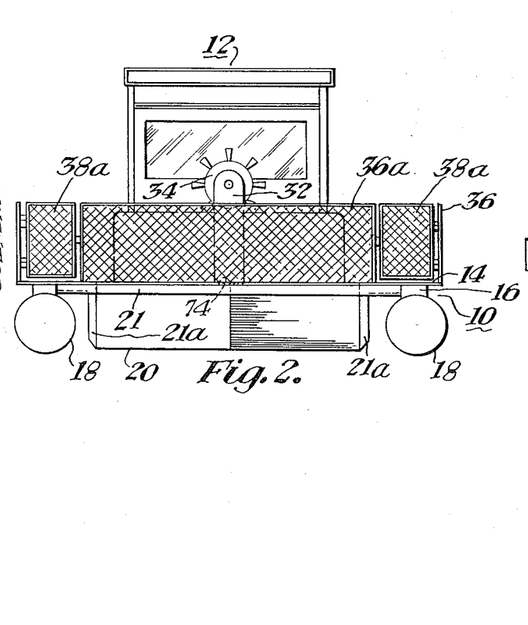
FIG. 2 is a front (bow) elevational view of the trailer float shown in FIG. 1.
Figure 3:
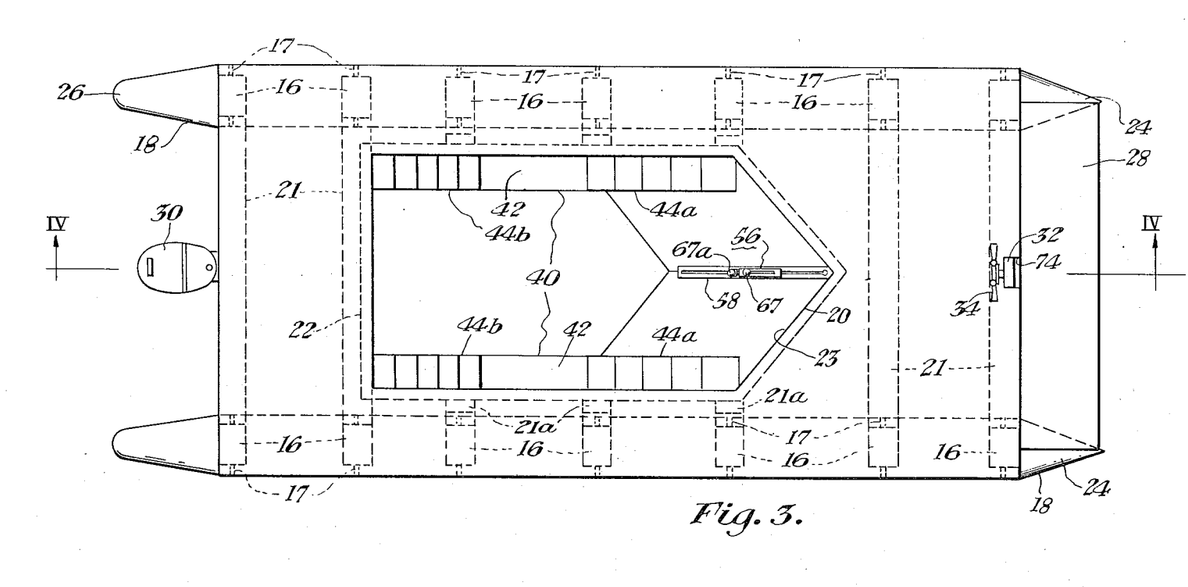
FIG. 3 is a top plan view showing the float construction in its unloaded condition.

Referring now more particularly to FIGS. 1–4 of the drawings, my novel trailer float 10 is illustrated in this example as accommodating a conventional camping trailer 12, shown here in its unfolded condition. It will be understood, of course, that the size of the camping trailer 12 is not critical and that, moreover, a variety of sizes of conventional travel trailers likewise can be mounted on the float structure 10. In this arrangement, the float 10 includes a substantially flat deck structure 14, which generally surrounds the trailer 12 when positioned on the float 10 and which is supported by a plurality of stanchions 16 upon a pair of elongated pontoons 18. The deck 14 also is supported by a trailer well or hull construction 20. As better shown in FIGS. 3 and 4, the hull is provided with an upper peripheral flange 22 by which the hull is secured to the deck 14 closely adjacent its central opening 23 (FIG. 3). The hull flange 22 can be bolted or welded or otherwise secured to the deck structure 14.

In the illustrated arrangement, each of the pontoons 18 is of generally tubular or hollow configuration and desirably is spaced outwardly of the hull or trailer well 20 in outrigger fashion for increased stability. As better shown in FIG. 2 the trailer float 10 can be further stabilized through the use of a number of cross channels 21 secured at their ends to associated pontoon stanchions 16 and to the undersurface of the deck structure 14. Additional cross channels 21a are employed further to secure the hull 20 to the deck structure 14 and to the pontoons 18, through adjacent ones of the stanchions 16. As best shown in FIG. 3 the length of the pontoons 18 and their spacing from the central trailer well 20 is such that the overlying deck structure 14 affords an adequate surface area for walking and/or recreational purposes. Depending upon the overall elevation of the deck 14, a bow or splash deck 28 can be secured directly to the bow ends 24 of the pontoons 18 to prevent or minimize a washing of the main deck 14.

Each of the stanchions 16 is shaped, as desired, to engage properly the adjacent top surfaces of the pontoons 18. The upper surfaces of the stanchions 16 in this example are shaped for flush insertion into the decking channels 21, 21a. Other forms of deck beams or supports, besides the channeled members 21, 21a, can be employed and suitably engaged with the stanchions 16 or otherwise with the pontoons 18.

Desirably a number of partitions 17 can be peripherally sealed to the inner wall surfaces of the related pontoons 18 in order to compartmentalize each of the pontoons. Thus, a leak in one or more of the pontoon compartments 19 will not necessarily destroy the effectiveness of the pontoon. Alternatively, the partition plates 17 can be omitted, and this safety feature can be preserved by substantially filling each of the pontoons 18 with a foamed styrene or other suitably foamed, buoyant material. With the latter construction, a major rupture can occur in one or both of the pontoons 18 without substantial loss of buoyancy. For maximum safety, both the sealed compartments 19 and the foamed plastic filling can be employed, with the foamed plastic being inserted into each of the compartments 19 during manufacture of the float, before sealing of the pontoons 18.

The bow end of the trailer well 20 desirably is provided with a more or less pointed or V-shaped configuration 25 for streamlining purposes. This portion of the trailer well can also be configured to accommodate a trailer tongue, as set forth below. The trailer float 10 desirably is powered by a conventional outboard motor 30 in this case mounted on the stern of the deck structure 14. Operation and steerage of the outboard motor 30 can be controlled from the bow of the float 10 by means of a conning column 32. A ship's wheel 34 or the like and other controls (not shown), located on the conning column 32, are connected through suitable and conventional mechanical linkages (not shown) to the outboard motor 30.

As a further safety precaution, the pontoon 18 can be structured so that their combined buoyancy is capable of supporting the entire weight of the trailer float when loaded. By the same token, the hull 20 can be dimensioned to afford a similar buoyancy. Thus, the trailer float would remain afloat in the event of major or terminal damage to either the hull 20 or to both pontoons 18. The pontoons 18 desirably are spaced beneath the deck structure 14, and thus their bottom surfaces are at about the same elevation of the bottom of the hull 20, for substantially uniform draft. The hull or well 20, however, can be spaced upwardly of the pontoon bottoms, i.e. above the water line, if desired. In such cases the well 20 need not be leak proofed, but such leak proving is desirable to realize the safety factor noted above.

The periphery of the deck area 14 desirably is fenced in by safety railing 36, which can be provided with one or more entrance gates 38, 38a (FIGS. 1 and 2). A bow section 36a of the railing is detachably secured by conventional means to the decking 14 and thus can be readily removed to facilitate loading and unloading of a trailer unit, as better shown in FIG. 6. For the same purpose, a pair of gates 38a can be furnished one on each side of the removable railing section 36a.

Figure 4:
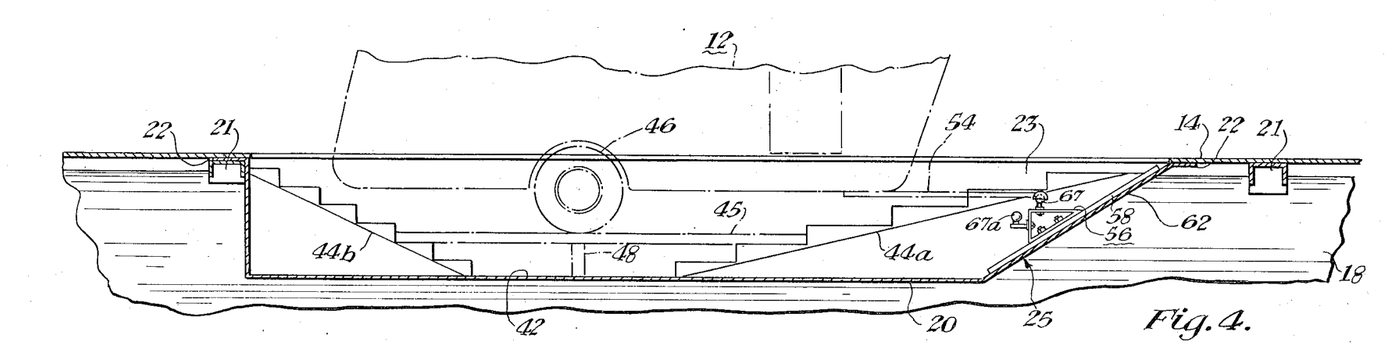
FIG. 4 is a longitudinally sectioned view of the float construction as shown in FIG. 3 and taken along reference line IV—IV thereof.

To facilitate inserting and withdrawing the undercarriage of the trailer 12 relative to the hull section 20, a pair of stepped ramp structures 40 are provided as better shown in FIGS. 3 and 4. The ramps 40 are mounted along the larboard and starboard sides of the hull 20 and are so spaced as to be substantially aligned with the wheels, respectively, of the trailer 12. In the vast majority of travel and camping trailers, the track or the distance between the wheels varies at most about 6 inches. The structural width of each of the ramp structures 40 and the spatial separation therebetween, are selected, therefore, with a view to accommodating this large group of trailer shapes and sizes.

Those trailers having the highest floor elevation can be lowered down the ramp structures 40 until the wheels thereof rest upon the lowest surfaces 42 of the ramp structures, which surfaces 42 are defined by the separation between each related pair of the stepped configurations 44a–44b described below. At this position, the floor of such trailers is substantially at the same elevation as that of the float decking 14. Slight elevational misalignments can be compensated by laying thin boards or other shims onto the ramp structures 40, in this case on the lowest surfaces 42.

On either side of the surfaces 42 the ramp structures 40 are each provided with a related pair of stepped configurations 44a and 44b. The steps of the configurations 44a are rather broad (in the forward-aft direction) to facilitate lowering and raising the trailer 12 up and down this portion (44a) of each ramp structure 40. On the other hand, the individual steps of the stepped configurations 44b (which in cooperation with the stepped portions 44a, respectively, are used for elevational positioning of the trailer 12) can be quite narrow to conserve space within the hull 20.

Figure 1A:
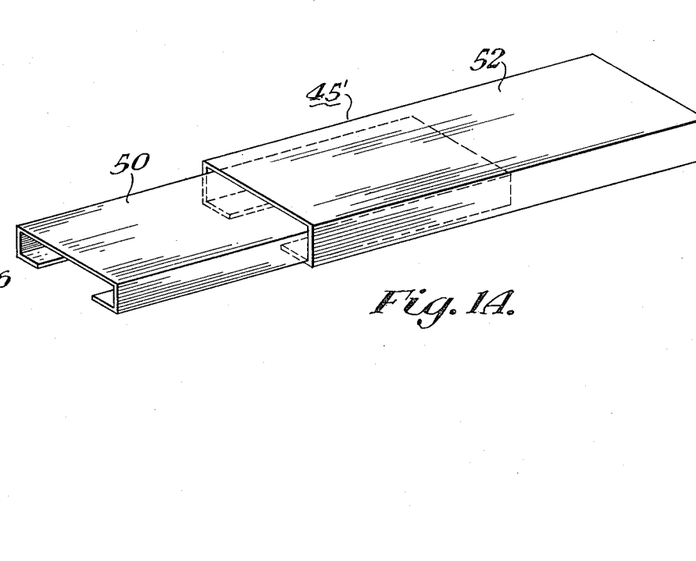
FIG. 1A is an enlarged isometric view of an adjustable truss arrangement for use with the trailer float.

As better shown in FIG. 1, a plank, elongated plate, or truss 45 can be extended from selected, preferably forward-aft aligned steps of each related pair of stepped configurations 44a–44b to elevate the trailer wheels 46, when necessary for substantially levelling the trailer floor relative to the decking area 14. For supporting longer plank or truss lengths, a vertical and substantially central strut 48 can be utilized.

Where a given float 10 may accommodate a variety of sizes of trailers thereon an adjustable truss can be provided as better shown in FIG. 1A. In the illustrated arrangement, the truss 45' includes extensible and inter-fitting truss sections 50, 52. The truss sections can be shaped in many differing ways depending upon the extended truss configuration, and the size and weight of the trailers to be used with a particular float structure 10. Various indexing means (not shown) can be provided to ensure that the extended truss does not slip off a selected pair of respective steps on a given pair of the opposed stepped configurations 44a, 44b. The extendable trusses of FIG. 1A, or other suitable support can also be employed as ramps for loading and unloading the trailer 12 from a dock or the bank of a body of water relative to the float construction 10 or 10' as better shown in FIG. 6.

Figures 4A, 4B, 6:
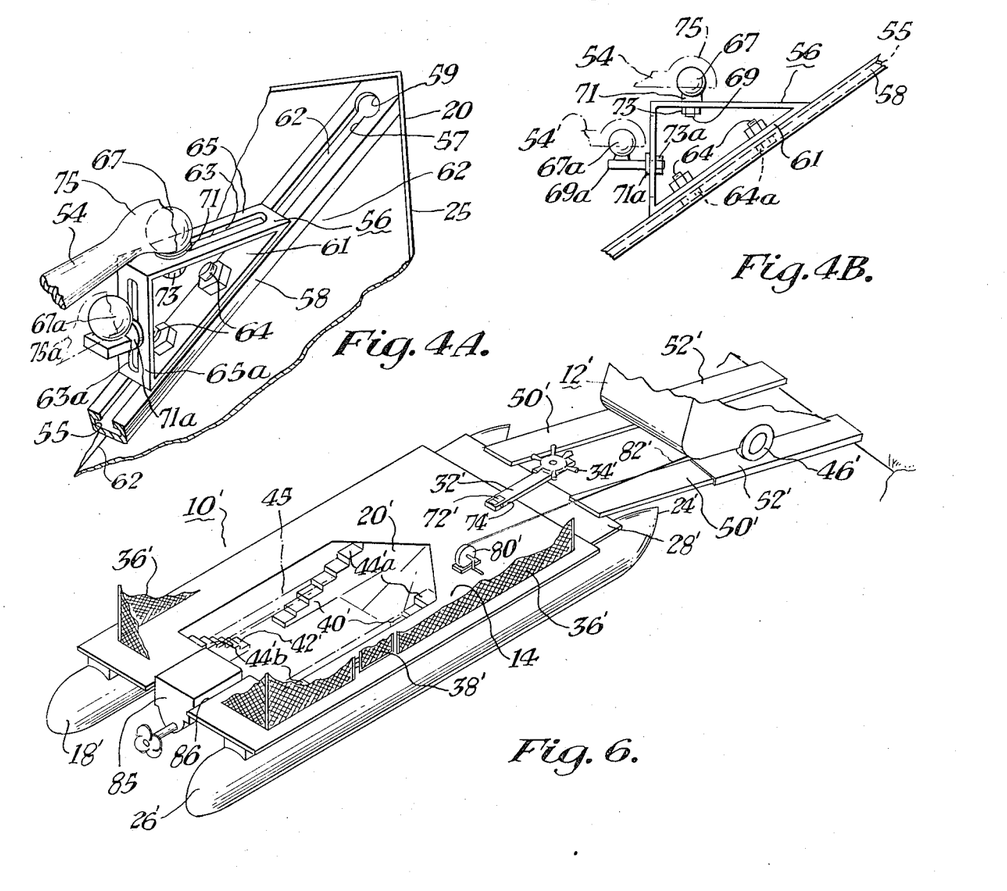
FIG. 4A is a partial isometric view showing in greater detail the tongue block and associated components of FIG. 4.
FIG. 4B is an elevational view of the apparatus of FIG. 4A.
FIG. 6 is an isometric view of a modified trailer float construction according to my invention.

Depending upon specific elevation of the trailer relative to the hull 20, as effected by a specific position of the supports 45, the trailer tongue 54 can be adjustably supported adjacent the bow of the hull 20 in order to level the trailer floor relative to the decking 14. One means for so adjustably supporting the trailer tongue 54 includes a slidably mounted tongue block 56 mounted on track means 58 extended along the incline of the bow 25 of the hull 20 and desirably at the prow 62 thereof (FIGS. 4 and 4A). The track means and the tongue block 56 are provided with a cooperating tongue-in-groove or dove-tailing arrangement or other interfitting means so that the tongue block 56 is slidably secured and guided along the track 58.

As best shown in FIGS. 4A and 4B the aforementioned interfitting means includes a groove 55, having a narrowed slot-opening 57, in the track means 58, which is disposed in this example generally along the inclined bow portion 62 of the hull 20, or otherwise supported on an inclined portion within the hull. The tongue block 56 can be secured at any elevation along the track means 58 through use of mounting bolts 64, the heads 64a of which are fitted and retained in the groove 55, which desirably is expanded at one end as denoted at 59 (FIG. 4A) for this purpose. The mounting bolts 64 in this example are inserted through suitable apertures therefor in hypotenuse 61 of the tongue block 56, in this example of open triangular configuration.

An additional degree of freedom is afforded for the adjustable connection of the trailer tongue 54 to the hull 20, i.e., to the track means and tongue block 56–58. Desirably the tongue block is further provided with an elongated slot 63, in this example on its upper or horizontal leg 64. A ball connection member 67 is provided with a mounting stud 69 inserted through the elongated slot 63 for adjustable movement therealong. Insertion of the stud 69 through the slot 63 is delimited by a widened shank portion 71, thereof (or by means of a lock nut, not shown), and the ball member 67 can be secured at any selected point along the slot 63 by tightening its mounting nut 73. Desirably, the ball member 67 is shaped similarly to that of a conventional trailer hitch for securance to the conventional and complementary coupling 75 provided at the free end of the trailer tongue 54.

The horizontal projection of the track means 58 and the tongue block slot 63 are respectively of such lengths as to accommodate the many and varying sizes of trailer and camper tongues which may be encountered in the use of the trailer float 10. This is evident from the realization that smaller trailers or campers having shorter trailer tongues usually have a lower floor elevation, and their corresponding shallower under-carriages can be moved forwardly of the trailer well 20 along the planks or trusses 45 (FIG. 1). Conversely, the differing inclinations of the forward and aft ramp portions 44a, 44b permits a larger trailer to be moved rearwardly and downwardly of the hull section. Thus, the ball member adjustment slot 63 does not require the length which would seem to be pre-requisite at first glance.

A still further degree of freedom is afforded for the adjustable connection of the trailer tongue 54 to the trailer well or hull 20 by means of a second ball member 67a connected to an angular stud member 69a. A threaded end portion of the stud 69a is inserted through an elongated slot 63a formed in this example in a vertical leg portion 65a of the tongue block 56, where the stud 69a can be secured at a selected position along the slot 63a by means of mounting nut 73a. With the arrangement as shown in FIGS. 4A and 4B the trailer tongue 54 can be secured alternatively to the ball member 67 and 67a depending upon the type of adjustment which is required. In the later connection as denoted by dashed outline 54' thereof the trailer tongue 54 can be adjusted vertically of the inclined track 58 rather than horizontally. It will be understood that the tongue block 56 can be provided with either or both of the adjustment means 67, 67a, depending upon a specific application of the invention.

The cooperative adjustments of the tongue block 56 along the track means 58 and the trailer tongue 54 and its coupling 75 along the length of the tongue block 56 is, therefore, adequate for the proper leveling of the trailer floor with the deck structure 14 for virtually every size of trailer or camper within the physical limitations of the trailer float 10. Moreover, the adjustable securance of the trailer or camper tongue 54 to the tongue block 56 at least aids in positioning the trailer 12 (or camper) along the lengths of the planks or tursses 45, or along the bottomost portions 40 of the ramp structures 44 as the case may be.

Figure 5:
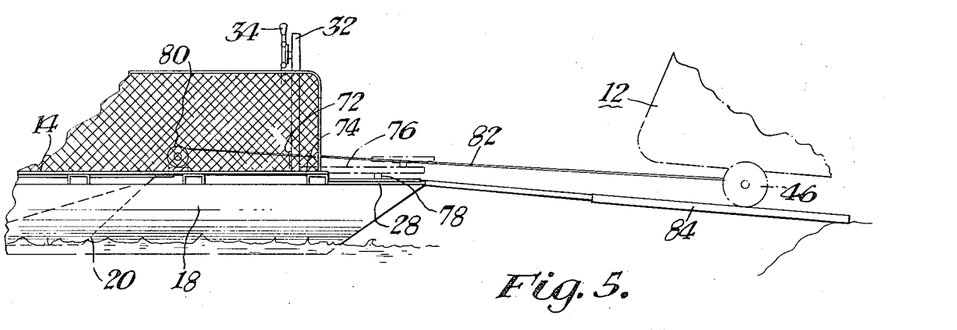
FIG. 5 is a partial side elevational view of the forward portion of the float construction, showing a foldable conning column and winch means useful in loading and unloading the trailer float.

Referring now to FIG. 5 of the drawings means are provided for facilitating loading and unloading of the trailer float 10. The conning column 32 is hingedly mounted on the forward end of the decking 14 by means of hinge 72 at deck slot 74. The column 32 is maintained in its upright position by suitable indexing means. The conning column 32 thus can be moved from its solid outline or operating position of FIG. 5 to its trailer loading and unloading position denoted by its chain outline 76, whereat the adjacent portion of the column is passed through the deck slot 74. In the latter position, the conning column is supported on splash deck 28 and can be provided with nib 78 or other spacer for positioning purposes. The provision of the aforementioned mechanical linkages (between the conning column 32 and the outboard motor 30) in the form of flexible cables (not shown), of course, facilitates the folding of the conning column 32.

As further shown in FIGS. 5 and 6 a conventional hand operated winch 80 is detachable mounted forwardly on the decking 14 or 14' adjacent the bow 24 of the hull 20. The winch line 82 can be hooked or otherwise detachably secured to the trailer axle or other portion of the undercarriage and the winch 80 operated to draw the trailer 12 up a pair of wheel ramps 84. When thus loading the trailer 12, the wheels 46 thereof, will, of course, straddle the conning column in its folded position. When the trailer 12 has been drawn onto the forward portion of the decking 14 or 14', the hand winch 80 can be detached from its position as shown in FIG. 5 and mounted (not shown) at the leading edge of the main deck or on the splash deck 28 for the purpose of lowering the trailer into the trailer well or hull 20. For unloading the trailer 12 from the float 10 the aforementioned procedure is reversed. Operation of the winch 80 thereby facilitates movement of the trailer 12 up and down the forward, stepped portions 44a of the ramps 40, or from or to the temporary positions of the trailer wheels 46 on the lowest ramp structure portions 42 or on a selected one of a number of higher elevations as determined by use of the supports 45. As mentioned previously, such supports can be variously engaged with the ramp structures 40' by selecting forward-aft aligned pairs of steps on the stepped configurations 44'a, 44'b.

FIG. 6 illustrates also the provision of the trailer float 10' with an inboard engine denoted generally at 85. The engine 85, which is similarly controlled by the conning column 32', can be located in compartment 86 of the hull 20'. In this arrangement, the compartment 86 is located generally between the sternward, stepped portions 44'b of the ramp structure 40', in avoidance of the trailer wheels 46' when the trailer 12 is loaded onto the float 10'.

Figure 7:
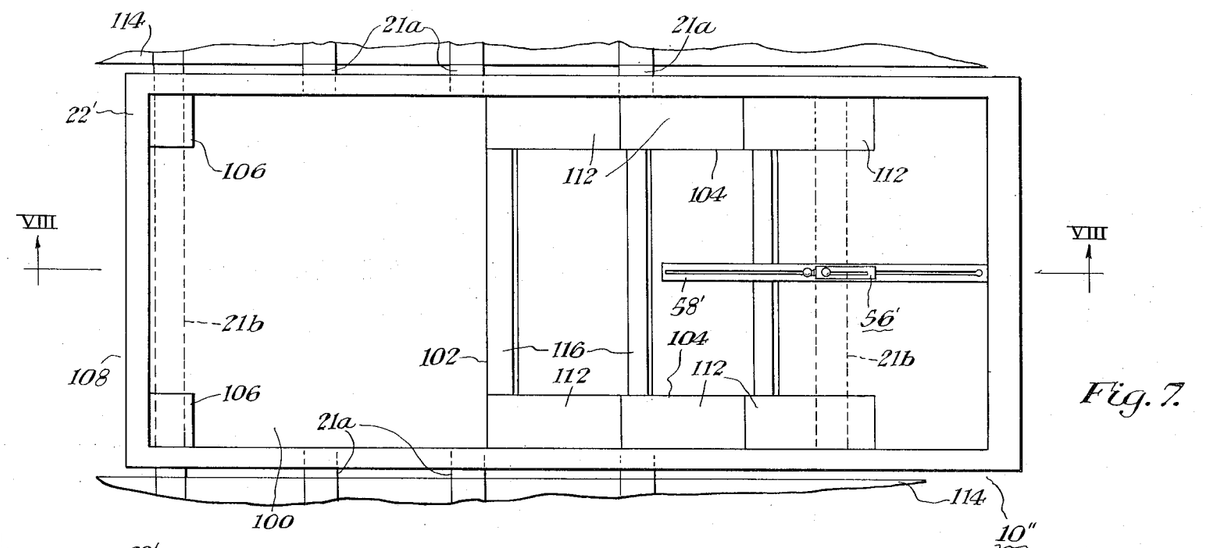
FIG. 7 is a partial top plan view of still another form of my novel trailer float construction.
Figure 8:
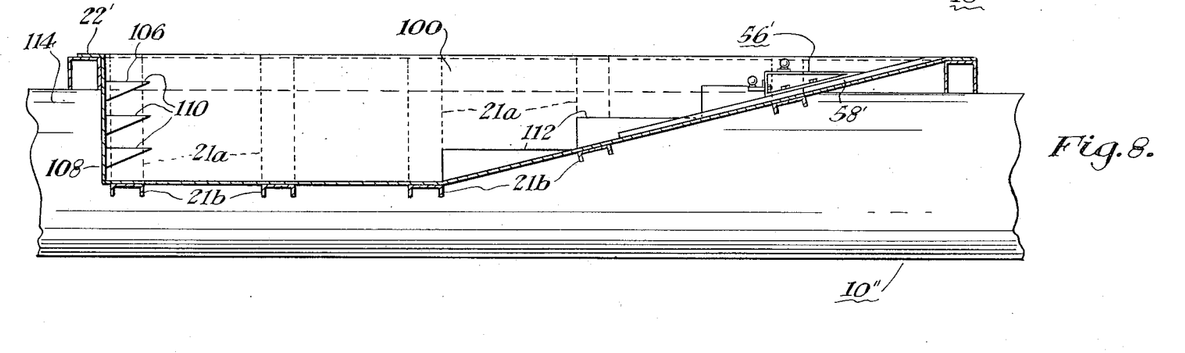
FIG. 8 is a longitudinally sectioned view of the float construction of FIG. 7 and taken generally along reference line VIII—VIII thereof.

A modified float construction 10'' is illustrated in FIGS. 7 and 8 of the drawings. In this arrangement the trailer well 100 is provided with an integral ramp structure 102 in a forward portion thereof. Thus the trailer well 100 is provided with an upwardly inclined floor section forming the ramp structure 102, which, in those cases wherein the trailer well 100 forms also a buoyant hull, provides a streamlining effect. The ramp portion 102 of the well is wide enough to accommodate the undercarriage of the largest travel trailer for which the float 10'' is designed.

In this arrangement the ramp structure 102 is provided with a pair of spaced, stepped configurations 104 which are generally aligned with the trailer wheels (not shown in FIGS. 7 and 8). Although three such steps are shown in FIGS. 7 and 8, it will be appreciated that a different number can be employed. As better shown in FIG. 8, upstanding, stepped support configurations 106 are formed, in this example, on stern end 108 of the trailer well 100. The individual steps 110 of the stepped supports 106 are substantially aligned longitudinally with the steps 112 of the stepped configurations 104. This permits the use of the expansible truss members such as illustrated in FIG. 1A or other support means for the trailer wheels after the manner of FIG. 1. Alternatively the rear ramp configurations 44b (FIG. 3) can be substituted for the stepped supports 106. It is also contemplated that the adjustable step structures 136–138 described below in connection with FIGS. 9, 9A and 10 can be substituted for the stepped configurations 106.

The trailer well 100 as shown in FIG. 8 can be designed, if desired, so that it clears the water when the trailer float 10'' is loaded. In such case the pontoons 114 can be displaced downwardly of the trailer well 100, as shown in FIG. 8, and can be provided with sufficient combined buoyancy to support the trailer float and the trailer loaded thereon. The trailer well 100 can be joined to the deck structure by any suitable means, for example by means of well flange 22' and beam members 21a ' (FIGS. 2 and 3). Where the trailer well 100 is not intended to be buoyant or otherwise project into the water, additional well support can be provided by beam members 21b passed transversely across the bottom of the well 100 as shown in FIG. 8. Where the trailer well 100 is intended to be buoyant and support a substantial portion of the trailer load, the cross-beams 21b can be omitted where drag is an important consideration particularly in those trailer floats designed for faster propulsion. In such case the floor of the trailer well 100 can be reinforced by suitable means within the trailer well, for example by beams or other suitable supports 116 extended between the steps 112.

The trailer well 100 desirably is further provided with a tongue block and adjustment track 56', 58'. The last-mentioned items can be arranged after the teachings of FIGS. 4A and 4B.

Figure 9:
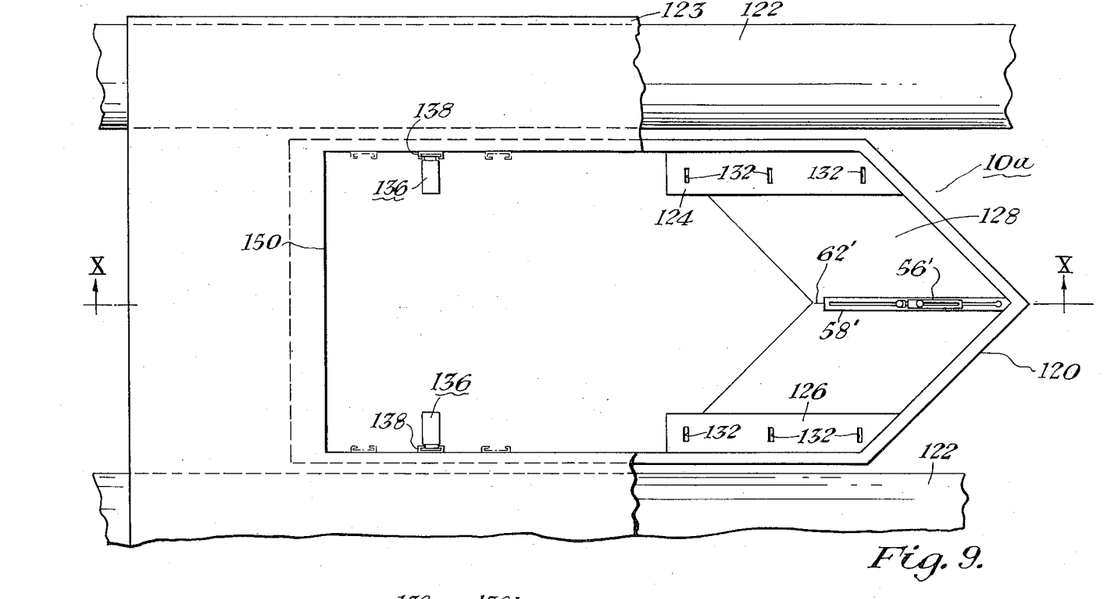
FIG. 9 is a partial top plan view of still another form of my novel trailer float construction.
Figure 9A:
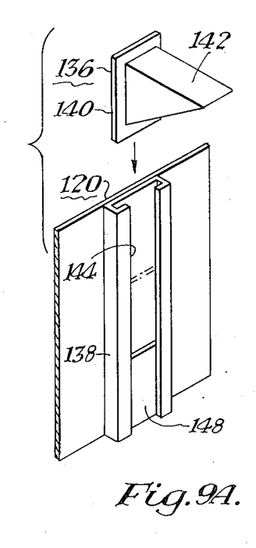
FIG. 9A is a partial, enlarged isometric view of the float construction as shown in FIG. 9.
Figure 10:
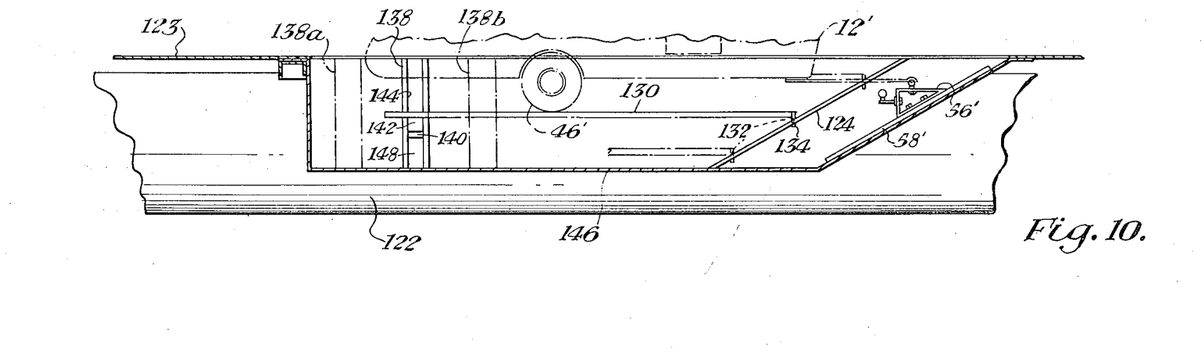
FIG. 10 is a longitudinally sectioned view of the float construction of FIG. 9 and taken generally along reference line X—X thereof.

Another modified float construction 10a, is shown in FIGS. 9, 9A and 10 of the drawings and is provided with a hull 120 for receiving the undercarriage of a trailer 12' (FIG. 10). The hull 120, which can be formed as illustrated in accordance with the teachings of FIGS. 1–6, is positioned as shown between a pair of pontoons 122, with an interconnecting deck structure 123 similar to that illustrated previously. Alternatively the hull 120 can generally take the form of the trailer well structure 100 of FIGS. 7 and 8. As illustrated the hull 120 includes a pair of ramp structures 124, 126 positioned in the bow section 128 of the hull 120. The ramp structures 124, 126 which are not stepped but merely inclined in this arrangement, are spaced apart for general and respective alignment with the trailer wheels 46', which engage the ramps to aid in loading and unloading the trailer 12' from the hull 120. An adjustable tongue block 56' is mounted for movement along track 58' in the prow 62' of the hull 120 as described previously.

In order to position the trailer 12' at selected elevations within the hull or trailer well 120 each ramp structure 124 or 126 is provided with suitable indexing means for cooperation with complementary indexing means on truss 130 or similar support (FIG. 10). In this example the ramp indexing means includes a number of slots 132 formed at spaced locations along the length of each ramp. A complementary positioning tab 134 is secured to the forward end of each truss or plank 130 and is insertable into a selective one of the slots 132.

Cooperating with the slotted ramp structures 124, 126 a stepped configuration such as the step structures 106 of FIGS. 7 and 8 can be formed adjacent the stern of the hull or well 120. Alternatively as shown in FIGS. 9, 9A and 10, an adjustable step structure 136 (FIG. 9A) can be provided as part of each wheel support structure together with means for supporting the step structures 136 at differing elevations corresponding to the elevations of the ramp slots 132. One arrangement for thus supporting the adjustable step members 136 includes a pair of step channels 138 secured in this example to the larboard and starboard side respectively of the hull 120 and near the stern thereof. The channels 138 are shaped as better shown in FIG. 9A to partially enclose a plate portion 140 of the associated step structure 136 such that the step 136 slidably is engaged but retained in the channel. When thus engaged step portion 142 of each step structure 136 protrudes through channel opening 144 of engagement by the truss or other support member 130 (FIG. 10).

In order to support the step constructions 136 at one or more positions above the lowest position of the step construction where the plate 140 thereof engages the bottom 146 of the hull 120, one or more blank plates 148 (FIG. 9A) can be first inserted into each step channel 138. Depending upon the elevational distance between adjacent ramp slots 132 the blank or spacer plates 148 can be shaped similarly to the plate portion 140 of each step construction 136. Alternatively, duplicate step structures can be inserted in place of one or more of the spacing plates 148.

Ideally, the step channels 138 are spaced from the stern 150 of the hull 120 such that the same truss or plank 130 can be used for each of the ramp slots 132. Where this is not feasible, for example owing to the size, shape or weight distribution of a given trailer, additional step channels 138a and/or 128b can be provided and spaced as shown in order to accommodate differing lengths of supporting trusses (not shown). Alternatively the adjustable truss of FIG. 1A can be utilized.

Figure 11:
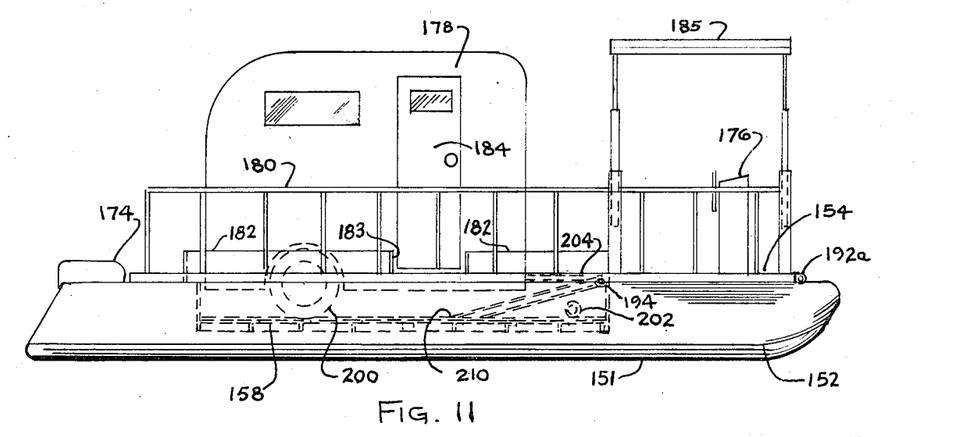
FIG. 11 is a side elevational view of still another form of my novel trailer float construction.
Figure 12:
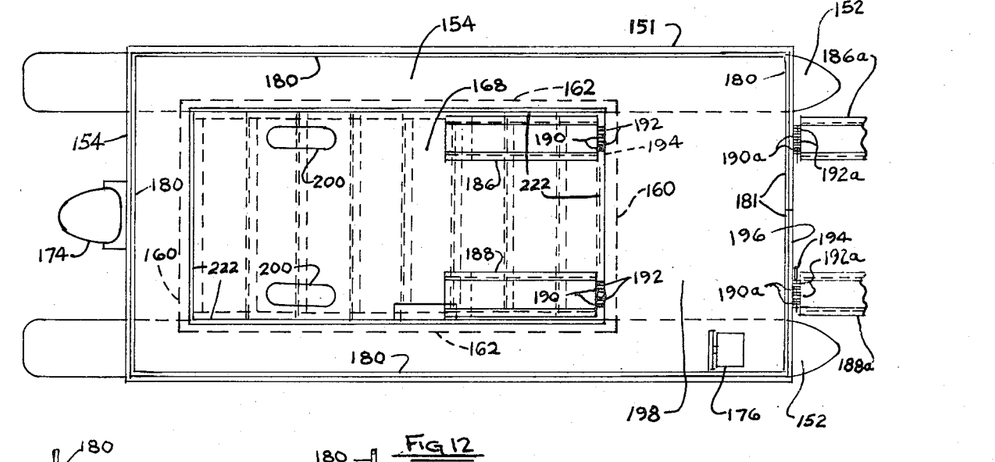
FIG. 12 is a top plan view of the float construction of FIG. 11.
Figure 13:
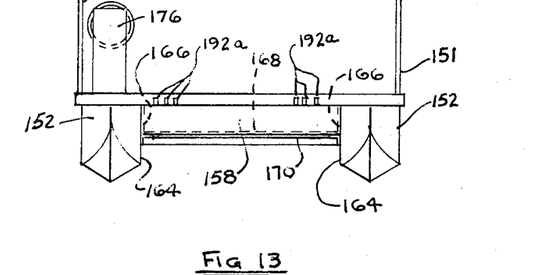
FIG. 13 is a front elevational view of the float construction of FIGS. 11 and 12.
Figure 13A:
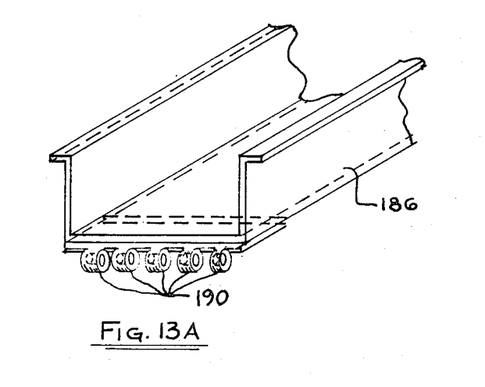
FIG. 13A is a partial enlarged isometric view of the movable ramp structure shown in FIGS. 11 through 14.

With reference now to FIGS. 11–13 of the drawings the exemplary form of my novel trailer float 151 shown therein pontoons a pair of ponottons 152, or the like floatation means, on which is supported a deck structure 154. The deck structure 154 is provided with an enlarged central opening 156 to which a trailer well 158 is secured as described previously. Alternatively the trailer well 158 can be joined to the desk structure 154 by a series of peripheral flanges 160, 162 secured to the undersede of the deck structure 154. As in the proceeding figures the deck opening 156 and the trailer well 158 is shaped to accommodate the wheels of the trailer 178 and at least the floor plan configuration thereof.

In this arrangement of the invention the floatation equipment or pontoons 152 are pentagonal in cross section as better shown in FIG. 13. It will be understood of course that other cross sectional configurations can be substituted for example hexagonal or circular. In this example, the pontoons 152 are provided with vertical (as viewed in FIG. 13) relatively flat surfaces 164, with which the sidewalls 166 of the trailer well 158 are flushly engaged. Alternatively the sidewalls 166 can be iliminated and the juxtaposed portions of the surfaces 166 themselves can form the sidewalls of the trailer well 158. In any event the sides of the pontoons can at least partially define the well structure 158.

The trailer well 158 further includes a bottom plate 168 which can be supported on a number of transversely extending angle irons 170 or other suitable supports, which are spaced along the length of the trailer well 158 (FIG. 1). The supports 170 are rigidly secured at their ends to the pontoon surfaces 166 respectively (FIG. 13). As noted previously the trailer well 158 can thus be supported above the surface 172 of the water, even when loaded, in avoidance of leak proofing of the trailer well which can then be provided with drainage aperatures (not shown). As noted previously the pontoons 152 desirably are compartmented and/or filled with light weight packing such as foamed polystyrene.

As better shown in FIG. 12 the pontoons 152 can be protruded forward and aft of the deck structure 154 to provide increased stability for the trailer float 150. In addition the rearwardly extending portions of the pontoons 152 provide a measure of protection for outboard motor 174. As evident from FIGS. 11–13 a conning tower 176 or the like can be mounted forwardly of the deck construction 154 and preferably to the side of the trailer well 158 in avoidance of the path of loading and unloading of the trailer 178. As noted previously a protective railing 180 having gates 181 can be extended about the outer periphery of the deck construction 154. A similar but lower railing 182 desirably surrounds the trailer well opening 156 or inner deck periphery as better shown in FIG. 11. The inner railing 182 can be provided with an adjustable opening 183 for trailer door 184. For increased passenger comfort a conopy 185 can be suspended over the forward deck area 198 (FIGS. 11 and 12).

As best shown in FIGS. 11 and 12 a pair of ramp structures 186, 188 are extended from the deck construction 154 toward the bottom plate 168 of the trailer well 158. Each ramp structure 186 or 188 can be formed from a channel beam (FIG. 13B) to provide the requisite strength or from other suitable supporting means. Each ramp 186 or 188 is hingedly joined to the deck structure 154 at the associated upper edge of the trailer well 158 as shown in FIG. 11. In furtherance of this purpose each ramp 186 or 188 provided with hinge components 190 affixed thereto which complement similar hinge components 192 which are permanently secured to the deck structure 154. Desirably the hinge component 190, 192 are arranged in the form of a piano type hinge through which a hinge pin 194 is removably inserted. Thus, the ramps 186, 188 can be removed from the trailer well 158 when not required for loading or unloading of the trailer 78.

The ramps 186, 188 together with their hinge components and their deck hinge components are of course positioned in substantial alignment with the trailer wheels 200. In addition the width of each ramp structure 186, 188 is sufficient to accommodate a normal variation in trailer wheel track widths.

In addition to their function in lowering the trailer 178 from the deck construction 154 into the trailer well 158, and vice versa, the ramp structures 186, 188 can serve an added function in loading and unloading the trailer 178 between the shore or a dock and the deck construction 154. In furtherance of this purpose the forward edge 196 of the deck construction 154 is provided with additional hinge components 192a which are similar to the hinge components 192. The hinge components 192a likewise can be permanently affixed to the deck structure 154. With this arrangement the ramp structures 186, 188 can be removed from the trailer well 158 and hingedly but removably secured to the forward edge 196 of the deck structure 154. From this edge the ramp structures 186, 188, as denoted by chain outlines 186a, 188a thereof, can be hingedly extended toward the shore or a dock for use in loading the trailer 178 onto the forward area 198 of the deck construction 154. Then, the ramp structures 186, 188 can be removed from the forward edge of the deck structure and replaced at the trailer well 158 as shown by their solid outlines in FIGS. 11 and 12. The trailer 178 then can be lowered from its imtermediate position on the forward deck area 198 to its proper position in the trailer well 158 as shown in FIG. 11. To remove the trailer 178 from the float 151 the aforedescribed operations are reversed.

It is also contemplated that the ramp structures 186, 188 can be left permanently in position in the trailer well 158 and additional ramp structure (not shown) can be removably secured to the forward edge 196 of the deck structure 154 during loading and unloading of the trailer 178 relative to the shore or docking facilities. In such cases, the docking ramp structures 186a, 188a can be longer or shorter than the indicated relative lengths of the ramp structures 186, 188, as required.

FIG. 11 denotes the accommodation of a trailer 178 having maximum or near maximum wheel diameters or more properly a maximum or near maximum trailer floor elevation. In such cases the trailer wheels 200 can rest directly on the bottom plate or support 168 of the trailer well 158. In any event the trailer 178 can be supported on its wheels 200 in conjunction with its front dolly wheel 202, all of which are normally provided as part of the trailer structure. Alternatively the four corners of the base of the trailer 178 can be supported on the usual trailer jacks (not shown).

For small initial discrepancies between the level of the deck construction 154 and the level of the trailer floor, the trailer wheels 200 can be shimmed by placing one or more thin boards or the like thereunder and by adjusting the crank structure 204 of the dolly wheel 202. Where the trailer floor is initially too high air can be bled from the trailer wheels 200. The aforementioned jacks can be manipulated alternatively to raise the floor level of the trailer 178 relative to the deck 154 when desired.

Figures 14, 14A, 14B:
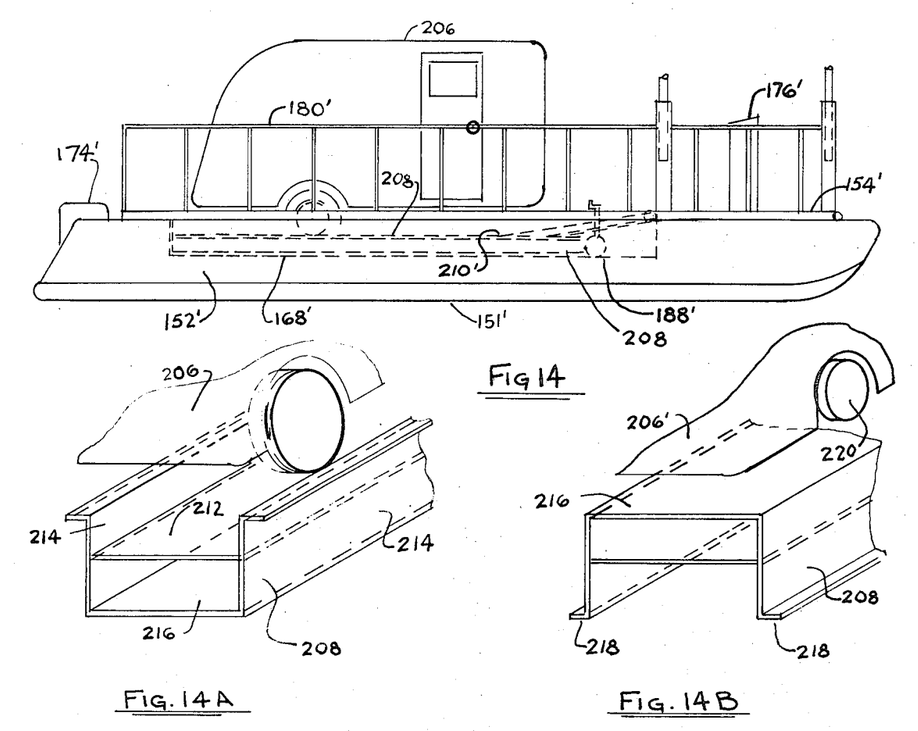
FIG. 14 is a view similar to FIG. 11 but showing the use of reversible elevating members in conjunction with a novel ramp construction.
FIG. 14A is a partial enlarged isometric view of one of the elevating members of the preceeding figure.
FIG. 14B is a similar view showing the elevating member of FIG. 14A in an inverted position.

For smaller trailers such as the trailer 206, or in any event for those trailers having a lower floor structure, a wheel elevating arrangement such as that shown in FIGS. 14, 14A can be utilized. The trailer float construction 150' of FIG. 14 is generally similar to that of FIGS. 11–13, and similar reference characters with primed accents are utilized to denote similar components. The trailer float 150' thus is provided with ramp structures 186', 188' which are hinged to the deck structure 154' as described previously in connection with FIGS. 11–13.

To accommodate intermediate and smaller sizes of travel or tent trailers, a pair of elevating members such as the elevating member 208 are laid upon the bottom well plate 168' in alignment with the hinged ramps 186', 188' respectively. To permit insertion of the removable elevating members 208 into the well 158, the ramps 186', 188' can be pivoted upwardly. With the elevating members 208 thus positioned, the hinged ramps 186', 188' can be lowered such that their free ends 210' now engage the supporting surfaces of the elevating members 208 rather than the floor plate 168' of the trailer well 158', as better shown in FIG. 14.

One arrangement of the elevating member 208 is shown in FIG. 14A and is provided with a unique construction in order to accommodate a variety of sizes of trailers similar to the trailer 206. In this arrangement, the elevating member 208 is provided in the form of a channel member, U-shaped in cross section. Midway along the vertical sides (as viewed in FIG. 14A), an auxiliary supporting plate 212 is welded or otherwise secured to the side walls 214 of the elevating member 208. The auxiliary supporting plate 212 desirably is substantially parallel with the bottom supporting plate 216 of the elevating member 208.

For intermediate sizes of trailers such as the trailer 206 the elevating members 208 are inserted into the trailer well 158' such that their bottom supporting plates 216 rest upon the floor plate 168' of the trailer well. Wheels 207 of the trailer 206 then rest on the intermediate supporting plates 212 of the elevating members (FIG. 14A). On the other hand as better shown in FIG. 14B the elevating members 208 can be reversed such that their longitudinal flanges 218 rest upon the floor plate 168' of the trailer well. With this arrangement smaller sizes of trailers such as trailer 206' can be supported with their wheels 220 resting on the main support plates 216 of the elevating members 208, with their door sills approximately at deck level.

The hinged character of the ramp structures 186', 188' permits the free ends 210 thereof to rest upon either the auxiliary supporting plates 212 when the elevating members 208 are in the position denoted by FIG. 14A or upon the main supporting plates 216 thereof when the elevating members 208 are in their inverted positions as shown in FIG. 14B. Moreover, when the elevating members are not used, such as shown in FIG. 11, the free ends 210 of the ramp structures 186, 188 then rest directly upon the floor plate 168 of the trailer well 158. A trailer in the intermediate range of sizes such as denoted by trailer 206 in FIG. 14A or in the smaller range of sizes such as denoted by trailer 206' in FIG. 14B can be manipulated as described above in connection with FIGS. 11–13 in order to align or substantially align its floor with the deck structure 154' (FIG. 14).

From the foregoing it will be apparent that novel and efficient forms of convertible trailer floats and utility boats have been described herein.

The float structure, itself, has many if not all of the advantages of a houseboat, while adding the advantage of portability and multiple usage of the trailer. At the same time the trailer float constructions, particularly that shown in FIG. 11 can be used as a typical utility craft, without a trailer thereon. In the latter case, deck plates or the like (not shown) can be provided to cover temporarily the trailer well, such as the trailer well 158. In the latter case, the deck plates (when used) can be supported on peripheral ledges 222 (FIG. 12) to provide a continuous deck surface for recreational or work purposes.

While I have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

I claim:

1. A trailer float comprising flotation means, a substantially flat deck structure mounted on said flotation means, said flotation means being secured to said structure adjacent a generally central opening therein, a well structure secured to said deck structure about said opening and extending downwardly therefrom, said central opening and said well structure being shaped to accommodate wheels and at least a floor plan configuration of said trailer, and a ramp structure secured to said deck structure at said opening and extending downwardly therefrom into said well structure, said ramp structure being shaped to accommodate said trailer wheels to aid in raising and lowering said trailer wheels and the floor plan portion of said trailer through said opening and into said well structure, and supporting means within said well structure for supporting said trailer thereon.

2. The combination according to claim 1 wherein said ramp structure includes a pair of ramp members disposed in substantial alignment with the wheels respectively of said trailer.

3. The combination according to claim 2 wherein each of said ramp members include forward and aft stepped configurations, the steps of the configurations of each of said ramp structures being substantially aligned to receive said supporting means for the associated one of said trailer wheels.

4. The combination according to claim 3 wherein the stepped configurations of each ramp structure are spaced longitudinally of said supporting means to define a lowermost position of the associated trailer wheel.

5. The combination according to claim 1 wherein an adjustable tongue block is slidably mounted on an inclined portion of said supporting means for adjustably elevating a trailer tongue forming part of said trailer for leveling a floor or door sill of said trailer relative to said deck structure.

6. The combination according to claim 5 wherein trailer tongue engaging means are provided on said tongue block and are adjustably positionable along the length thereof.

7. The combination according to claim 6 wherein said tongue engaging means include a conventionally shaped ball member for movement along said tongue block length in a plane including the path of adjustable tongue block movement.

8. The combination according to claim 6 wherein additional trailer tongue engaging means are provided on said tongue block and are adjustably positionable along the height thereof.

9. The combination according to claim 8 wherein each of said adjustable tongue engaging means includes a conventionally shaped ball member, said ball members being capable of movement respectively along and across said tongue block in a plane including the path of adjustable tongue block movement.

10. The combination according to claim 1 wherein a safety railing substantially surrounds said deck structure and is secured to the outer periphery thereof.

11. The combination according to claim 10 wherein a bow section of said railing is removable relative to said deck during loading and unloading of said trailer relative to said float.

12. The combination according to claim 1 wherein a foldable conning column is hingedly secured to a forward portion of said deck.

13. The combination according to claim 1 wherein said flotation means include a pair of elongated pontoons secured to said deck structure adjacent the outer lateral edges thereof, with said well structure extending between said pontoons.

14. The combination according to claim 13 wherein said pontoons are spacedly secured both to said deck and to said supporting means.

15. The combination according to claim 1 wherein said ramp structure is formed integrally with said supporting means at a forward position thereof.

16. The combination according to claim 1 wherein said supporting means include elevating means for said trailer wheels, and cooperative indexing means are formed on said ramp structure and on said elevating means for positioning said elevating means and said wheels at selected elevations relative to said ramp structure.

17. The combination according to claim 16 where said indexing means are formed adjacent one end of said elevating means, and adjustable step means are mounted on said supporting means and spaced from said ramp structure for engaging and supporting the other end portion of said elevating means.

18. The combination according to claim 1 wherein means are provided in said opening for substantially aligning a floor of said trailer with said deck structure.

19. The combination according to claim 1 wherein said ramp structure is hingedly and removably secured to said deck structure.

20. The combination according to claim 19 wherein complementary hinge members are permanently secured to said ramp structure and to a portion of said deck structure adjacent said central opening respectively, and means are provided for hingedly and removably adjoining said hinge components.

21. The combination according to claim 19 wherein said trailer supporting means include a pair of elevating members positioned thereon in alignment with said wheels and with said ramp structure, said ramp structure being pivotable to accommodate said elevating members.

22. The combination according to claim 21 wherein each of said elevating members are of channeled configuration and are invertable such that in an upright position thereof they support said trailer wheels at a substantially differing elevation relative to said supporting means than in their inverted position.

23. The combination according to claim 1 wherein said well structure is substantially watertight and is shaped to provide buoyant support for both said float and said trailer in the event of partial or total loss of said flotation means.

24. The combination according to claim 1 wherein said flotation means are disposed adjacent each lateral side of said well structure.

25. A trailer float comprising a substantially flat deck having a generally central opening therein, a well structure secured to said deck at a position juxtaposed to said opening, and a pair of pontoons secured adjacent the outward lateral edges respectively of said deck and positioned outwardly of said well structure, said well structure extending downwardly from said deck and generally between said pontoons, said central opening and said well structure being shaped to accommodate wheels of said trailer and at least a trailer floor plan configuration including a trailer tongue thereof, said well structure being shaped to shield completely said trailer wheels and said trailer floor plan configuration when positioned therein to protect the undercarriage of said trailer, said well structure having means for supporting said wheels.

26. The combination according to claim 25 wherein said pontoons and said deck extend fowardly and aft of said well for additional deck area and buoyancy.

27. The combination according to claim 25 wherein said well includes an inboard engine and compartment therefor in the aft portion of said well structure and positioned to aviod the wheels of said trailer when lowered into said well structure.

28. The combination according to claim 25 wherein said said well structure comprises a buoyant hull and said pontoons are outrigger pontoons.

29. The combination according to claim 28 wherein said pontoons are spacedly secured to said deck and are suspended at about the same elevation as that of a lower part of said hull relative to said deck.

30. The combination according to claim 25 wherein each of said pontoons is secured to said deck by a plurality of stanchions, each of said stanchions being shaped for flush engagement both with said pontoons and with an adjacent undersurface of said deck.

31. The combination according to claim 30 wherein means are provided for mounting an outboard motor on the after part of said deck structure.

32. The combination according to claim 30 wherein each of said stanchions is adjoined to the end portions of beam members forming part of said deck structure, and at least some of said beam members being extended to and downwardly of the sides of said well to at least aid in joining said well to said deck structure and to said pontoons.

33. The combination according to claim 25 wherein each of said pontoons is compartmented, and each of the compartments is filled with a foamed buoyant plastic.

34. The combination according to claim 25 wherein said pontoons project forwardly of said deck structure and at a lower elevation, and a splash deck is mounted on said pontoon projections and extends therebetween.

35. The combination according to claim 34 wherein a foldable conning column is hingedly secured to said deck structure and is foldable to a position of engagement with said splash deck.

36. The combination according to claim 25 wherein a forward portion of said well structure is sloped upwardly to form an integral ramp structure to aid in raising and lowering wheels of said trailer within said well structure, said ramp structure being shaped to accommodate the wheels and associated components of said trailer.

37. The combination according to claim 36 wherein said ramp structure includes a pair of stepped configurations spaced in substantial alignment with the wheels of said trailer.

38. The combination according to claim 37 wherein stepped support configurations are formed in an after portion of said well, the steps of said support configurations being substantially aligned with the steps of said well ramp to receive support means for said trailer wheels respectively.

39. The combination according to claim 38 wherein said support configurations are mounted in an upstanding array on a stern end of said well structure.

40. The combination according to claim 25 wherein means are provided in said well structure for substantially aligning a floor of said trailer with said deck.

41. The combination according to claim 25 wherein said pontoons are each of pentagonal cross-sectional configuration.

42. The combination according to claim 41 wherein said well structure is partially defined by adjacent flat surfaces of sand pontoons extending respectively along the length thereof and along the lateral extremities of said well structure.

43. The combination according to claim 25 wherein means are provided for closing said opening in the absence of said trailer to afford a continuous deck surface for recreational purposes.

44. The combination according to claim 25 wherein said well structure is substantially watertight and is shaped for buoyant support of said float and said trailer in the event of substantial loss of buoyancy of said pontoons.

45. The combination according to claim 44 wherein said well structure is further shaped such that its bottom-most portions are disposed above a water level when said float is floated in the absence of loss of buoyancy of said pontoons.

46. The combination according to claim 25 wherein means are disposed in said well structure for supporting said trailer therefrom.

47. The combination according to claim 25 wherein an outboard motor is mounted on an afterportion of said deck and generally between extended sections of said pontoons.

48. The combination according to claim 25 wherein a bow portion of said well structure is pointed for streamlining and to accommodate a tongue of said trailer.

49. A trailer float comprising a substantially flat deck having a generally central opening therein, a well structure secured to said deck at a position juxtaposed to said opening, a pair of pontoons secured adjacent the outward lateral edges respectively of said deck and positioned outwardly of said well structure, said well structure extending downwardly from said deck and generally between said pontoons, said central opening and said well structure being shaped to accommodate wheels of said trailer and at least a floor plan configuration thereof, said well structure being shaped to shield completely said trailer wheels and said trailer floor plan configuration when positioned therein to protect the undercarriage of said trailer, and ramp means formed in a forward portion of said well structure and aligned respectively with wheels of said trailer to aid in raising and lowering said trailer within said well structure.

50. The combination according to claim 49 wherein said ramp means are provided with indexing means, support means are provided for said trailer wheels, and complementary indexing means are formed on said support means for cooperation with said ram indexing means for positioning said support means and said wheels at selected elevations relative to said ramp means.

51. The combination according to claim 49 wherein a wheel support is provided for each of said trailer wheels together with means for engaging said wheel supports with said ramp means at differing elevations, and an adjustable step structure is provided for each of said wheel supports.

52. The combination according to claim 51 wherein each of said adjustable step structures include at least one upstanding track member and a step member slidably mounted therein, together with means for positioning said step members at selected elevations along said track members.

53. A trailer float comprising flotation means, a substantially flat deck structure mounted on said flotation means, said flotation means being secured to said deck structure adjacent a central opening therein, and a ramp structure secured to said deck structure and extending downwardly therefrom at said opening, said ramp structure being shaped to accommodate the wheels of said trailer to aid in raising and lowering said trailer within said opening, said central opening being shaped to accommodate at least the floor plan configuration of said trailer, supporting means mounted adjacent said opening for supporting said trailer therein, said ramp structure being hingedly and removably secured to said deck structure, complementary hinge members permanently secured to said ramp structure and to a portion of said deck structure adjacent said central opening respectively, means for hingedly and removably adjoining said hinge components, and additional complementary hinge components mounted on a forward edge portion of said deck structure in alignment with a loading and unloading path of said trailer, said additional hinge components being remote from the first-mentioned hinge components for alternate securance of said ramp structure thereto in loading and unloading said trailer between said float and a dock or shore.

54. A trailer float comprising a substantially flat deck having a generally central opening therein, a well structure secured to said deck at a position juxtaposed to said opening, and a pair of pontoons secured adjacent the outward lateral edges respectively of said deck and positioned outwardly of said well structure, said well structure extending downwardly from said deck and generally between said pontoons, said central opening and said well structure being shaped to accommodate wheels of said trailer and at least a floor plan configuration thereof, said well structure being shaped to shield completely said trailer wheels and said trailer floor plan configuration when positioned therein to protect the undercarriage of said trailer, said pontoons each being positioned against an adjacent side of said well structure, and supporting means extended directly between said pontoons to support a bottom wall of said well structure.

* * * * *